(12) United States Patent
Vyas

(10) Patent No.: US 6,913,186 B2
(45) Date of Patent: Jul. 5, 2005

(54) APPARATUS AND METHOD FOR FRICTION STIR WELDING WITH A VARIABLE SPEED PIN

(75) Inventor: Amitabh Vyas, Wichita, KS (US)

(73) Assignee: The Boeing Company, Chicago, IL (US)

(*) Notice: Subject to any disclaimer, the term of this patent is extended or adjusted under 35 U.S.C. 154(b) by 47 days.

(21) Appl. No.: 10/659,938

(22) Filed: Sep. 11, 2003

(65) Prior Publication Data

US 2004/0046003 A1 Mar. 11, 2004

(51) Int. Cl.[7] .............................................. B23K 20/12
(52) U.S. Cl. .................................. 228/112.1; 228/2.1
(58) Field of Search ............................... 228/112.1, 2.1

(56) References Cited

U.S. PATENT DOCUMENTS

| | | | |
|---|---|---|---|
| 5,165,589 A | 11/1992 | Nied et al. | |
| 5,240,167 A | 8/1993 | Ferte et al. | |
| 5,460,317 A | 10/1995 | Thomas et al. | |
| 5,469,617 A | 11/1995 | Thomas et al. | |
| 5,595,670 A | 1/1997 | Mombo-Caristan | |
| 5,829,664 A | 11/1998 | Spinella et al. | |
| 6,102,636 A | * 8/2000 | Geise | 409/231 |
| 6,168,067 B1 | 1/2001 | Waldron et al. | |
| 6,191,379 B1 | 2/2001 | Offer et al. | |
| 6,299,050 B1 | * 10/2001 | Okamura et al. | 228/110.1 |
| 6,595,403 B2 | * 7/2003 | Okamura et al. | 228/112.1 |
| 6,729,526 B2 | * 5/2004 | Okamoto et al. | 228/2.1 |
| 2002/0027155 A1 | * 3/2002 | Okamura et al. | 228/112.1 |
| 2002/0125297 A1 | * 9/2002 | Stol et al. | 228/112.1 |
| 2003/0029903 A1 | * 2/2003 | Kashiki et al. | 228/112.1 |
| 2004/0074944 A1 | * 4/2004 | Okamoto et al. | 228/2.1 |

FOREIGN PATENT DOCUMENTS

| | | |
|---|---|---|
| DE | 199 53 260 A | 5/2001 |
| EP | 0810056 A2 | 12/1997 |
| EP | 1160029 A1 | 12/2001 |
| EP | 1 281 468 A | 2/2003 |
| JP | 2000 246465 A | 9/2000 |
| JP | 2000 301361 A | 10/2000 |
| JP | 2001138073 | 5/2001 |
| JP | 2001269779 A | 10/2001 |
| JP | 2001287053 A | 10/2001 |
| JP | 2002066761 A | 3/2002 |
| JP | 2002079383 A | 3/2002 |
| JP | 2003094175 A | 4/2003 |
| JP | 02003117668 A | * 4/2003 |
| JP | 2003266181 A | 9/2003 |
| WO | WO 96/38256 A | 12/1996 |
| WO | WO 99/39861 A | 8/1999 |
| WO | WO 01/28732 A | 4/2001 |
| WO | WO 02/07924 A1 | 1/2002 |
| WO | WO 02/074479 | 9/2002 |

OTHER PUBLICATIONS

T. Fukuda, *Friction stir welding (FSW) process*; Welding International, Welding Institute, Abington, GB. vol. 15, No. 8, 2001, pp. 611–615 (XP–001058539). ISSN: 0950–7116.
TWI, *Re-stir™—reversal stir welding*; Mar. 2003; four pages; http://www.twi.co.uk/j32k/unprotected/band_1/c1233.html.
Fig. 7 Surface appearance of Re-stir™ weld made in 6 mm thick 5083–O condition aluminum alloy at a welding speed of 1.6 mm/sec (96 mm/min), no date.

* cited by examiner

Primary Examiner—Kiley S. Stoner
(74) Attorney, Agent, or Firm—Alston & Bird LLP

(57) ABSTRACT

An apparatus and method for forming a friction stir weld joint in a workpiece are provided. The apparatus includes a friction stir welding tool having a shoulder and a rotatable pin extending therefrom. The rotational speed of the pin can be adjusted during a friction stir welding operation, e.g., cyclically and/or according to a predetermined schedule, so that the pin mixes the plasticized material of the workpiece. The workpiece can also be preheated before friction stir welding.

38 Claims, 5 Drawing Sheets

APPARATUS AND METHOD FOR FRICTION STIR WELDING WITH A VARIABLE SPEED PIN

BACKGROUND OF THE INVENTION

1) Field of the Invention

The present invention relates to friction welding and, more specifically, to an apparatus and method for friction stir welding with a pin having a variable rotational speed.

2) Description of Related Art

Friction stir welding is a process in which a rotating tool, such as a pin or probe, is urged into and/or through a workpiece, e.g., to join multiple members of the workpiece in a solid state or to repair cracks in a workpiece. Typically, the pin extends from a shoulder, which can be flat, concave, or otherwise contoured, and the shoulder is urged against the workpiece so that the pin is urged therein. The pin is then urged through the workpiece to form a continuous weld joint. For example, during one conventional friction stir welding process, the probe of the rotating tool is plunged into a workpiece or between two workpieces by a friction stir welding machine to produce the required resistance force to generate sufficient frictional heating to form a region of plasticized material. The tool can be tilted approximately 3° relative to the workpiece such that the trailing edge of the shoulder is thrust into and consolidates the plasticized material. Upon solidification of the plasticized material, the members of the workpiece are joined along the weld joint. The magnitude of force exerted by the friction stir welding tool must be maintained above a prescribed minimum in order to generate the required frictional heating. Friction stir welding is further described in U.S. Pat. No. 5,460,317 to Thomas et al., the contents of which are incorporated herein by reference.

Some friction stir welding pins define helical threads, which can be right-hand threads, left-hand threads, or a combination thereof. Generally, the threads increase the mixing of the plasticized material in the region of the weld joint. Further, a support device is often provided behind the weld joint, e.g., an anvil or other backing device provided opposite the shoulder, to prevent deformation of the workpiece by the forces exerted by the friction stir welding tool and maintain dimensional tolerances. The shoulder and the backing device are typically urged together during welding to prevent material that is plasticized by the friction heat generated by the welding tool from flowing out of the weld joint. The inward clamping of the shoulder and backing device also consolidates the joint to minimize porosity and provide a weld joint having the desired surface finish.

A welding machine that is used to move the friction stir welding tool through the workpiece must often exert significant forces on the welding tool to move the welding tool at a particular speed through the workpiece. The force can depend in part on the thickness of the workpiece, the material of the workpiece, the length and diameter of the pin of the tool, the rotational speed of the tool, the speed of the tool through the workpiece, and the like. The forces required to achieve a particular weld joint can limit the speed at which the machine can be operated and, hence, the speed at which the joint can be formed. Further, the machine and tool typically require periodic maintenance and/or replacement, especially where the forces on the machine and the tool are significant.

Thus, conventional friction stir welding devices have been shown to form weld joints in which the material of the workpiece is plasticized and mixed, and the resulting granular structure in the weld joint is refined. However, a need continues to exist for an improved friction stir welding tool for forming weld joints in which the material has been optimally mixed and refined. The tool should allow for friction stir welding of a variety of workpieces, including thick workpieces, using a variety of welding machines and tools. The tool should be capable of effectively plasticizing and mixing the material. Preferably, the tool should also be compatible with features and methods for reducing the forces on the tool and machine during welding.

SUMMARY OF THE INVENTION

The present invention provides an apparatus and method for forming a friction stir weld joint in a workpiece. The apparatus includes a friction stir welding pin that is rotated and urged against the workpiece. Further, the rotational speed of the friction stir welding pin is adjusted cyclically and/or according to a predetermined schedule.

According to one embodiment of the present invention, the method includes adjusting the rotational speed of the pin between first and second predetermined speeds cyclically and/or in accordance with a predetermined schedule, the first speed being less than 99% of the average speed of the pin and the second speed being greater than 101% of the average speed of the pin. Further, the rotational direction of the pin can be reversed cyclically during operation. The rotational speed of the pin can be adjusted at a frequency of between about 0.1 Hz and 100 Hz, and the cyclic adjusting can be sinusoidal. For example, the rotational speed of the pin can be adjusted by varying an electric current supplied to an actuator that rotates the pin. Further, the workpiece can be heated before friction stir welding, e.g., by an induction heater.

The workpiece can be formed of various materials such as aluminum, aluminum alloys, titanium, titanium alloys, steel, or iron-nickel alloys.

The present invention also provides a friction stir welding apparatus that includes a rotatable pin structured to be urged against a workpiece to friction stir weld the workpiece, an actuator configured to rotate the pin, and a controller configured to adjust the actuator and thereby adjust a rotational speed of the pin according to a predetermined schedule. The controller can be configured to cyclically adjust the actuator and thereby adjust the rotational speed between first and second predetermined speeds, e.g., by adjusting an electric current provided to the actuator. The apparatus can also include a heater, such as an induction heater, configured to heat the workpiece.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
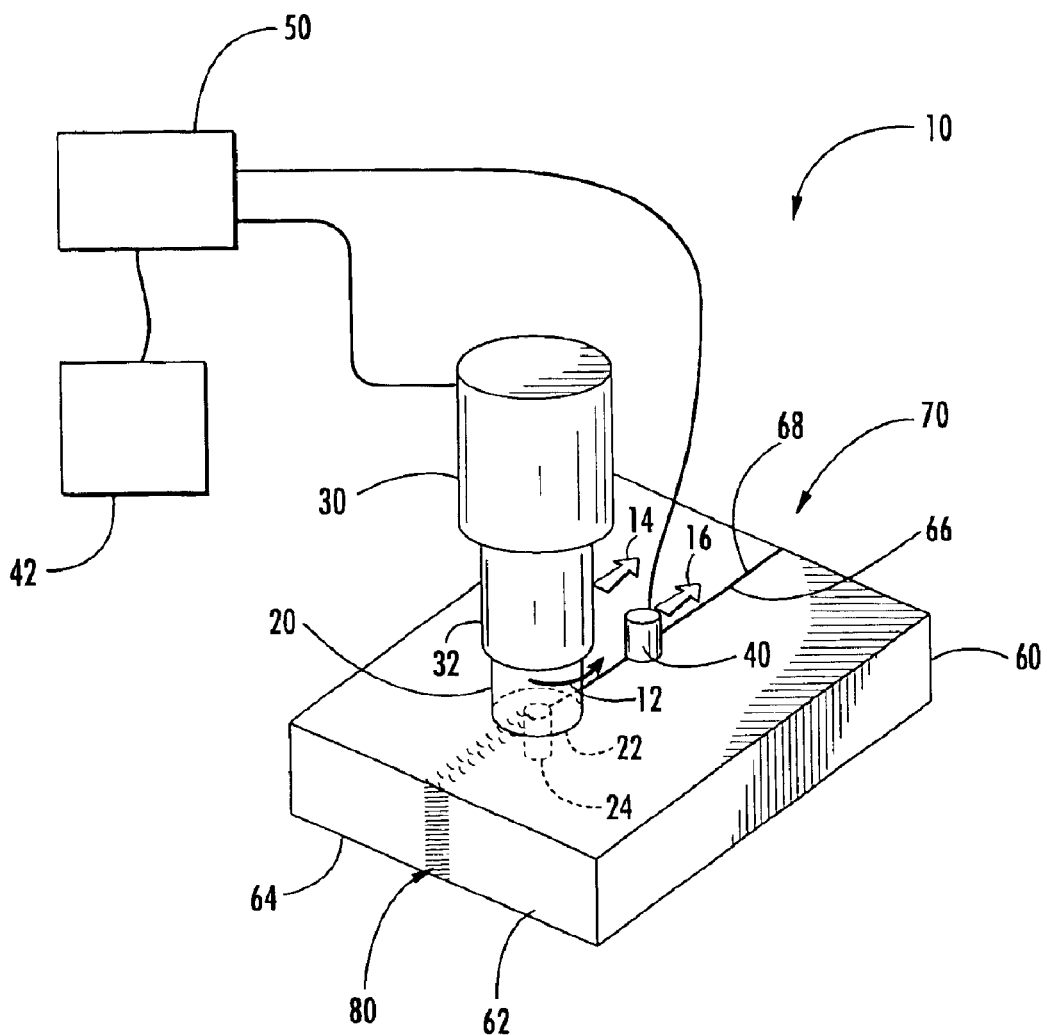
FIG. 1 is a perspective view illustrating a friction stir welding tool according to one embodiment of the present invention configured for friction stir welding two workpieces.

Referring now to the drawings and, in particular, to FIG. 1, there is shown an apparatus 10 for friction stir welding a workpiece 60 according to one embodiment of the present invention. The friction stir welding apparatus 10 includes a friction stir welding tool 20, and at least one actuator 30 for rotating the tool 20 and moving the tool 20 through the workpiece 60 to form a friction weld joint 80. For example, the friction stir welding tool 20 can be engaged to a chuck, spindle, or other member 32 that is engaged to the actuator 30. The actuator 30 can be any of various types of actuating devices, including electric, hydraulic, or pneumatic devices, any of which can include a mechanical linkage. For example, the actuator 30 can be part of a machine, such as a milling machine or a drill, that is structured for rotating and moving the friction stir welding tool 20. The actuator 30 be operated manually, but preferably is operated by a computer, microprocessor, microcontroller or other controller 50, which can be programmed to operate according to a schedule such as a schedule stored in or created by a computer software program.

The term "workpiece" is not meant to be limiting, and it is understood that the workpiece 60 can include one or more structural members 62, 64, which can be configured in various configurations. For example, as shown in FIG. 1, the edges 66, 68 of the two structural members 62, 64 can be positioned in abutting contact to form an interface 70 therebetween that can be welded to form the joint 80, e.g., a butt weld joint as shown in FIG. 1. Alternatively, other types of joints 80 can similarly be formed using the apparatus 10 of the present invention. For example, a lap joint can be formed by overlapping faying surfaces of the structural members 62, 64 and welding through an interface of the faying surfaces to form a lap joint that extends along the interface. The structural members 62, 64 can also be positioned and welded in other configurations, and any number of structural members 62, 64 can be joined by the joint 80. In another embodiment, the workpiece 60 can include a single structural member and the friction stir welding apparatus 10 can be used to form a weld joint in the member, e.g., to repair a crack, hole, or other defect therein or to affect the material properties of the structural member.

The structural members 62, 64 can be formed of a variety of materials including, but not limited to, aluminum, aluminum alloys, titanium, titanium alloys, steel, and the like. Non-metal materials can also be welded with the friction stir welding apparatus 10, e.g., materials such as polymers and the like. Further, the workpiece 60 can include members of similar or dissimilar materials, for example, structural members 62, 64 formed of different metals, including metals that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces formed of unweldable materials to be securely joined. Friction stir welding also can be used to securely join weldable materials to other weldable and to unweldable materials. Thus, the materials that form the workpiece 60 can be chosen from a wider variety of light weight, high strength metals and alloys, thereby facilitating reduction of the overall weight of the workpiece 60 and a structural assembly formed therefrom.

The workpieces 60 formed according to the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry. The friction stir welding apparatus 10 of the present invention can be used for friction stir welding large workpieces and workpieces having curvilinear geometries. In some applications, the members 62, 64 are joined in geometrical configurations that make difficult, or prevent, access to the opposing sides of the workpiece 60. For example, the structural members 62, 64 can be joined to form a partially or fully closed body such as a tube or an airplane wing.

As illustrated in FIG. 1, the friction stir welding tool 20 includes a shoulder 22 and a pin 24 extending therebetween. The pin 24 and shoulder 22 are preferably formed of a material having high strength and heat resistance. For purposes of example only and not limitation, the pin 24 and/or shoulder 22 can be constructed of tool steel, a molybdenum alloy, such as TZM, nickel alloys, such as Rene 41 (UNS N07041), and iron-nickel alloys. The shoulder 22 is structured to be urged against the workpiece 60 such that the pin 24 is inserted into the workpiece 60, e.g., into the interface 70 as shown in FIG. 1. In other embodiments of the invention, the tool 20 can include first and second shoulders that are structured in an opposed configuration with a pin extending between the shoulders such that the shoulders can be disposed opposite the workpiece 60 and frictionally engaged to opposite surfaces of the workpiece 60 therebetween. In either case, each shoulder 22 of the apparatus 10 can define a surface that is generally flat, tapered, concave, convex, or otherwise shaped, e.g., to engage the workpiece 60 and prevent "plowing," in which plasticized material from the workpiece 60 is pushed radially outside the circumference of the shoulder 22 as the tool 20 is moved along the workpiece 60. Further, each shoulder 22 can define one or more frictional features, e.g., raised portions or surfaces such as threads, bumps, or ribs that are structured to frictionally engage the workpiece 60. For example, a spiral thread can be provided on each shoulder 22 to engage the workpiece 60. The pin 24 also defines a stirring portion that engages the workpiece 60 during welding. The stirring portion of the pin 22 can be cylindrical or can define a variety of shapes and contours including helical threads, circumferential grooves, ridges, tapers, steps, and the like.

Figure 2:
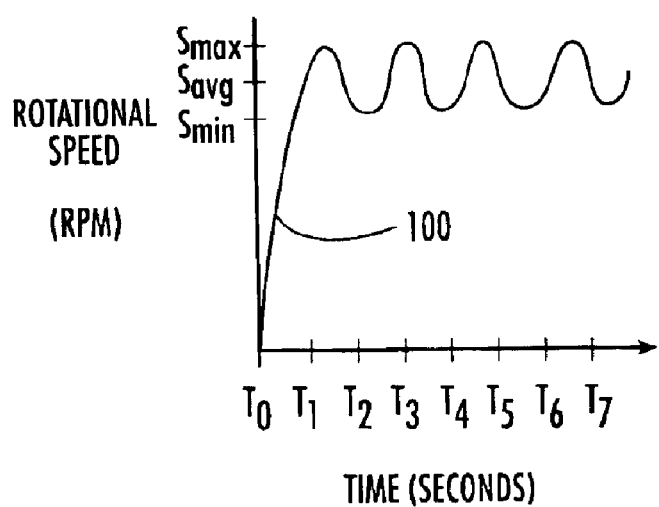
FIG. 2 is a graph illustrating the variation in the rotational speed of the pin during friction stir welding according to one embodiment of the present invention.

The actuator 30 is configured to rotate the tool 20 and, hence, the pin 24 at a variable rotational speed, which can be controlled by the controller 50. For example, in one embodiment of the present invention, the actuator 30 can be configured to rotate the pin 24 at an average speed $S_{avg}$ of between about 0 and 3000 revolutions per minute (RPM) in either rotational direction, though in some embodiments, the pin 24 may rotate at speeds that are faster than the foregoing range of speeds. Further, the rotational speed of the pin 24 can be varied throughout a welding operation. For example, as illustrated in FIG. 2, the rotational speed of the pin 24 is increased during an initiation period 100 between times $T_0$ and $T_1$ at the start of a welding operation. Thereafter, the rotational speed of the pin 24 is cyclically adjusted or modulated, between a minimum speed $S_{min}$ and a maximum speed $S_{max}$. For example, the rotational speed of the pin 24 can be decreased to the minimum speed $S_{min}$ at times $T_2$, $T_4$, $T_6$, and increased to the maximum speed $S_{max}$ at times $T_3$, $T_5$, $T_7$.

The cyclical variation can be sinusoidal, as illustrated in FIG. 2, such that the rotational speed of the pin 24 varies between the minimum speed $S_{min}$ and the maximum speed $S_{max}$ and has an average rotational speed $S_{avg}$ midway therebetween. The frequency of the variation is defined by the number of cycles of variation per second, expressed in hertz (Hz). During one cycle of variation, the rotational speed of the pin 24 increases from the minimum speed $S_{min}$ to the maximum speed $S_{max}$ and thereafter slows from the maximum speed $S_{max}$ to the minimum speed $S_{min}$. The frequency of variation in rotational speed of the pin 24 can be adjusted according to the thickness, material, or other mechanical properties of the workpiece 60, the speed at which the pin 24 is moved through the interface 70 to form the weld, the size and surface contour of the pin 24, the temperature of the workpiece 60, the rotational speed and variation in speed of the pin 24, the size and type of weld joint 80 being formed, the desired mechanical properties of the weld joint 80, and the like. For example, the frequency of variation can be increased for welding workpieces 60 having structural members 60, 62 with dissimilar material properties such as dissimilar grain sizes. In addition, the frequency of variation can be determined in part according to the angular separation of features on the pin 24, such as planar surfaces extending axially along the pin 24, or according to the pitch of threads defined by the pin 24. According to one embodiment of the present invention, the frequency of variation can be between about 0.1 Hz and 100 Hz.

The amplitude of the variation in rotational speed can also be adjusted according to the same or different factors as those used for determining the frequency of variation. For example, the amplitude can be increased or decreased for a correspondingly wider or narrower weld joint 80, respectively. The amplitude is equal to the difference in speed between the average speed $S_{avg}$ and either the maximum or minimum speeds $S_{max}$, $S_{min}$. That is, the amplitude is one half of the difference between the maximum speed $S_{max}$ and the minimum speed $S_{min}$. According to one embodiment of the invention, the pin 24 rotates at a speed of between about 100 and 3000 RPM, and the amplitude is between about 1% and 200% of the average rotational speed $S_{avg}$ of the pin 24.

Thus, the minimum rotational speed $S_{min}$ can be less than 99% of the average rotational speed $S_{avg}$, and the maximum rotational speed $S_{max}$ can be greater than 101% of the average rotational speed $S_{avg}$ of the pin 24. For example, if the average rotational speed $S_{avg}$ of the pin 24 is 100 RPM in the clockwise direction and the amplitude of the variation in rotational speed is 50% of the average rotational speed $S_{avg}$, the minimum speed $S_{min}$ is about 50 RPM (clockwise) and the maximum speed $S_{max}$ is about 150 RPM (clockwise).

Figure 3:
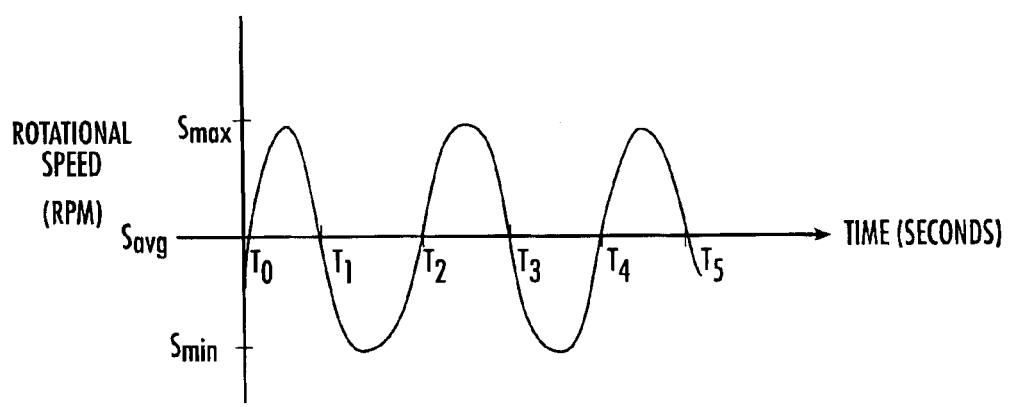
FIG. 3 is a graph illustrating the variation in the rotational speed of the pin during friction stir welding according to another embodiment of the present invention, in which the pin cyclically reverses direction.

Further, the amplitude of the variation in rotational speed can be greater than the average rotational speed $S_{avg}$ of the pin 24 so that the rotational direction of the pin 24 changes during operation. According to one embodiment of the invention, the average rotational speed $S_{avg}$ is less than 100 RPM and has an amplitude of variation that is between about 100 and 1000 RPM. Thus, the pin 24 can cyclically reverse rotational direction to rotate alternately in the clockwise and counterclockwise directions, with an average speed that can be zero or greater than zero. For example, if the average rotational speed $S_{avg}$ of the pin 24 is about 100 RPM in a clockwise direction and the amplitude of the variation in rotational speed is about 150% of the average rotational speed $S_{avg}$, the minimum speed $S_{min}$ is about 50 RPM in the counterclockwise direction, and the maximum speed $S_{max}$ is about 250 RPM in the clockwise direction. Alternatively, as illustrated in FIG. 3, the pin 24 can have no average rotational speed $S_{avg}$ (i.e., $S_{avg}$=0 RPM) and an amplitude that is greater than zero. Thus, the pin 24 reverses direction at times $T_1$, $T_2$, $T_3$, $T_4$, $T_5$ during the operation illustrated in FIG. 3 to rotate successively in the clockwise and counter-clockwise directions, attaining a maximum speed in each direction equal to the maximum and minimum speeds $S_{max}$, $S_{min}$, respectively.

A reduction in the rotational speed of the pin 24 generally reduces the frictional heat generated between the pin 24 and the workpiece 60. Thus, in those cases where the rotational speed of the pin 24 is less than about 100 RPM during at least some times of operation, e.g., where the rotational direction of the pin 24 reverses cyclically, the shoulder 22 of the tool 20 can be structured to sufficiently frictionally engage the workpiece 60 to plasticize the workpiece 60 or nearly plasticize the workpiece 60 so that the pin 24 can be moved through the workpiece 60 even when the rotational speed of the pin 24 is reduced. For example, the diameter of the shoulder 22 can be five times the diameter of the pin 24 or greater so that the shoulder 22 acts over a relatively large area proximate to the pin 24.

The rotational speed of the pin 24 can be adjusted according to other patterns or models of variation besides the sinusoidal variation illustrated in FIGS. 2 and 3. For example, the variation can be characterized by a shape that is sawtoothed, ramped, rectangular or triangular stepped, and the like. In addition, the speed of the pin 24 can be decreased and increased to different minimum and maximum speeds during successive variations. For example, the rotational speed can be decreased and increased to speeds that are predetermined or randomly selected. Further, the frequency of variation can also be constant or varied throughout a welding operation. For example, the rotational speed of the pin 24 can be constant during some periods and varied during others.

The adjustment of the rotational speed of the pin 24 can be controlled by the controller 50, e.g., according to a schedule or program stored in a memory of the controller 50. In this regard, the controller 50 can communicate with a power source, such as the power supply 42, that provides electrical power to the actuator 30. Further, the controller 50 can function as a current or voltage regulation device for varying the electric current that is provided to the actuator 30, thereby adjusting the speed of the actuator 30 and the rotational speed of the pin 24. Alternatively, the controller 50 can digitally control the actuator 30, e.g., by transmitting a digital electronic signal to the actuator 30 for controlling the rotational actuation of the pin 24.

Further, as shown in FIG. 1, the apparatus 10 can include a heater such as an induction heater 40 for heating the material of the workpiece 60 during the welding operation. The induction heater 40 is electrically connected to a power supply 42 and configured to induce an electric current in the workpiece 60, such that the workpiece 60 is resistively heated to a desired temperature. Alternatively, other types of heaters can be used such as lasers, electric resistive heaters, gas or other flame heaters, and the like. In some cases, inductance heating can be used to heat thick workpieces uniformly throughout the thickness of the workpiece, and other surface heaters, such as lasers, can be used to heat thin workpieces. Regardless of the type of heater 40 used in the apparatus 10, the workpiece 60 can be heated to a desired temperature before, during, and/or after being friction stir welded by the tool 20.

According to one embodiment of the present invention, the induction heater 40 is used to preheat the workpiece 60 to a desired temperature before friction stir welding. The preheating of the workpiece 60 can reduce the friction that is required between the pin 24 and the workpiece 60 for plasticizing the material of the workpiece 60 and friction stir welding the workpiece 60. Thus, in some embodiments, preheating can increase the speed at which the pin 24 can be moved through the workpiece 60 and/or reduce the forces that must be applied through the pin 24 to weld the workpiece 60. The desired amount of preheating can vary according to the thickness, material, or other mechanical properties of the workpiece 60, the rotational speed of the pin 24, the speed at which the pin 24 is moved through the interface 70 to form the weld joint 80, the size of the pin 24, the initial temperature of the workpiece 60, the type of weld joint 80 being formed, the desired mechanical properties of the weld joint 80, and the like. The induction heater 40 can be used to heat the workpiece 60 to a "preheat temperature" that is less than the plasticizing temperature of the workpiece 60. For example, the induction heater 40 can heat the workpiece 60 by at least 50° F. to a temperature that is less than the plasticizing temperature of the workpiece 60.

The induction heater 40 can be configured proximate to the friction stir welding tool 20 and configured to heat only a portion of the workpiece 60 at a time. Further, the induction heater 40 can be configured to move along the workpiece 60 in a path preceding the motion of the friction stir welding tool 20. Thus, the induction heater 40 can be configured to heat a portion of the workpiece 60 that is proximate to the pin 24 such that portions of the workpiece 60 away from the region of the friction stir weld joint 80 are heated only minimally or not at all. In some embodiments, the induction heater 40 can be connected to the friction stir welding tool 20 or actuator 30 or otherwise maintained at a uniform distance from the friction stir welding tool 20. Thus, the induction heater 40 can be moved simultaneously, and at a similar speed, with the friction stir welding tool 20. Alternatively, the induction heater 40 can be controlled separately from the friction stir welding tool 20, e.g., by the controller 50, such that the heater 40 moves independently from the welding tool 20. Thus, the heater 40 can be moved at a different speed than the tool 20 and adjusted to be closer or farther from the tool 20 according to the desired heating. Further, the amount of heating of the workpiece 60 achieved by the induction heater 40 can be adjusted during a welding operation, e.g., according to different physical properties of the workpiece 60 at different locations, adjustments in the rotational speed of the pin 24, the speed of the pin 24 through the workpiece 60, and the like.

Although the invention is not limited to any particular theory of operation, it is believed that the changes in rotational speed of the pin 24 affect the movement of the plasticized material of the workpiece 60 during welding. In particular, it is believed that increases and decreases in the rotational speed of the pin 24 generally result in an increase in the mixing of the plasticized material of the workpiece 60. In addition, it is believed that the heating of the workpiece 60 by the heater 40 can reduce the friction between the pin 24 and the workpiece 60 while still allowing the workpiece 60 to be plasticized. Thus, the variation in the rotational speed of the pin 24 can increase the mixing of the plasticized material even if the frictional forces between the pin 24 and the plasticized material are reduced, e.g., due to the heating of the workpiece 60 by the heater 40. In other embodiments of the invention, the rotational speed of the pin 24 can be varied without the use of the heater 40.

According to one embodiment of the present invention, the friction stir weld joint 80 is formed by moving the rotating friction stir welding tool 20 into contact with the workpiece 60 so that the stirring portion of the pin 24 and the shoulder 22 frictionally engage the workpiece 60. The rotating friction stir welding tool 20 can be moved through the workpiece 60 along a predetermined path to thereby form the elongate weld joint 80. Thus, the material of the workpiece 60 can be mixed by the pin 24, and the grain size of the material can be refined, thereby improving the material properties of the material at the joint 80.

For example, the weld tool 20 can be configured at an edge of workpiece 60, rotated in a direction 12, and urged in a direction 14 through the workpiece 60 such that the shoulder 22 contacts the surface of the workpiece 60, thereby constraining the axial movement of the plasticized material of the workpiece 60. Alternatively, if the weld joint 80 is to begin or end at a point inward from the edge of the workpiece 60, the tool 20 can be urged, or "plunged," into the workpiece 60 at the start of the weld joint 80 and/or subsequently retracted from the workpiece 60 after welding the workpiece 60. In either case, the urging force of the shoulder 22 against the workpiece 60 can be opposed by an anvil or other support device (not shown) positioned opposite the shoulder 22 or by a second shoulder connected to the pin 24 and positioned opposite the workpiece 60 from the shoulder 22. Thus, the workpiece 60 can be "sandwiched" between the shoulder 22 and another shoulder or support device proximate to the pin 24 during friction stir welding. Advantageously, the shoulder 22 and the second shoulder or other support device can create a seal that prevents the plasticized material from being extruded therefrom. Thus, planar or otherwise desired contours can be formed on the opposing sides of the workpiece 60 at the weld joint 80. If two shoulders are attached to the pin 24, the two shoulders can restrain the tool 20 axially against the workpiece 60 so that little or no axial force needs to be applied to the tool 20 during welding. As the tool 20 is urged in direction 14, the induction heater 40 heats the workpiece 60 and is moved in direction 16 in a path to precede the tool 20 so that the workpiece 60 is preheated by the heater 40 and subsequently plasticized by the tool 20. Further, the rotational speed of the tool 20 in direction 12 is cyclically adjusted, as described above, thereby mixing the plasticized material of the workpiece 60.

Figure 4:
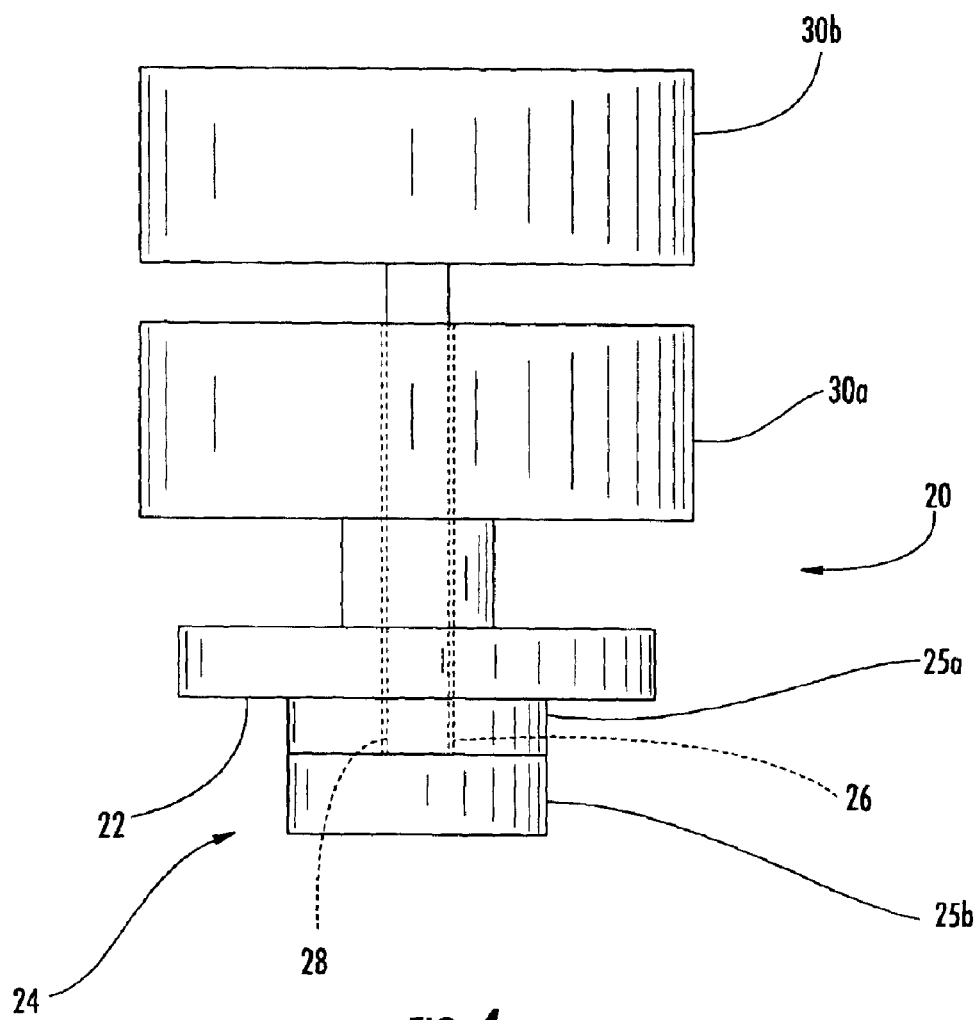
FIG. 4 is an elevation view illustrating a friction stir welding tool according to another embodiment of the present invention, the tool having a pin with two independently rotatable portions.

According to another embodiment of the present invention, the pin 24 can include more than one portion, each portion being independently rotatable. For example, the pin 24 of the tool illustrated in FIG. 4 includes first and second portions 25a, 25b. The second portion 25b is connected to a shaft 28 that extends through an aperture 26 defined by the first portion 25a such that the first portion 25a can be engaged to the shoulder 22 and a first actuator 30a, while the second portion 25b is engaged by a second actuator 30b. The actuators 30a, 30b can rotate the two portions 25a, 25b with different cyclic variations or according to different predetermined schedules. For example, the actuators 30a, 30b can rotate the two portions 25a, 25a with the same or different average speeds, minimum and maximum speeds, directions of rotation, frequencies of variation, magnitudes of variation, variation profiles or characteristics, timing of variation, and/or other aspects of rotation. Further, the first portion 25a can be configured to extend substantially through the first structural member 62, and the second portion 25b can be configured to extend substantially through the second structural member 64. Thus, the first and second portions 25a, 25b can be rotated according to the material properties of the first and second structural members 62, 64, respectively, so that each portion 25a, 25b effectively plasticizes and mixes the material of the respective member 62, 64.

Figure 5:
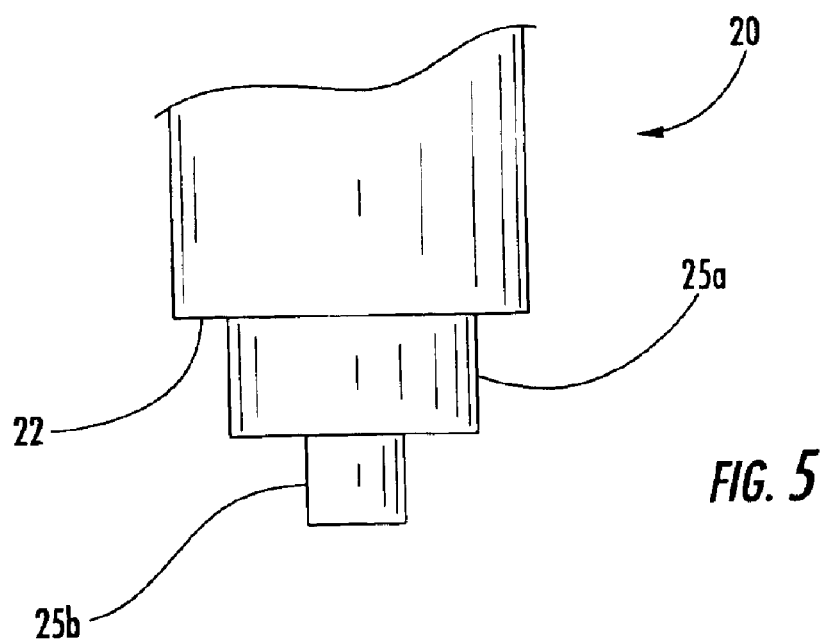
FIG. 5 is an elevation view illustrating a friction stir welding tool according to yet another embodiment of the present invention, the tool having a pin with two portions of dissimilar diameters.

Alternatively, the two portions 25a, 25b can be integral members or otherwise connected so that the portions 25a, 25b rotate together at the same rotational rate and with the same variation. For example, as shown in FIG. 5, the two portions 25a, 25b can be a unitary member that extends from the shoulder 22. Further, the first and second portions 25a, 25b can be selected or formed according to the material properties of the structural members 62, 64, the type of weld joint 80 being formed, and the like. For example, the diameter of the first structural portion 25a can be greater than the diameter of the second portion 25b so that the pin 24 frictionally engages more of the material in the first structural member 62 than in the second structural member 64. As a result of the dissimilar diameters of the two portions 25a, 25b, rotating the first and second portions 25a, 25b at a equal rotational rate results in different speeds of the outer surfaces of the portions 25a, 25b. In particular, the outer surface of the first portion 25a moves faster relative to the workpiece 60 than the outer surface of the second portion 25b. In addition, the two portions 25a, 25b with dissimilar diameters can be structured to be rotated at different rotational rates, e.g., as described in connection with FIG. 4.

Figure 6:
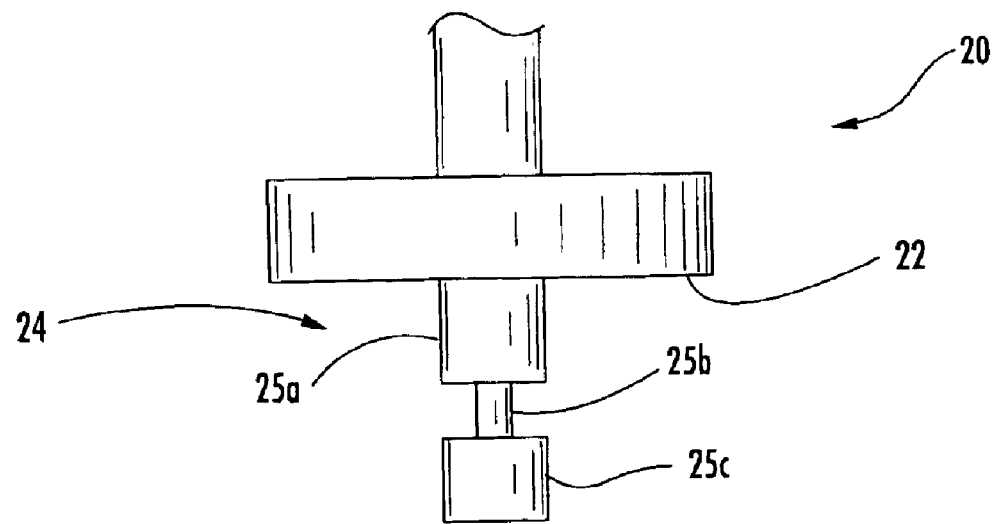
FIG. 6 is an elevation view illustrating a friction stir welding tool according to still another embodiment of the present invention, the tool having a pin with three portions.

In other embodiments of the present invention, the pin 24 can define three or more portions, each of which can define a different diameter and/or be structured for independent rotation. For example, FIG. 6 illustrates a tool 20 having a pin 24 that includes first, second, and third portions 25a, 25b, 25c. As shown, the first and third portions 25a, 25c are larger in diameter than the second portion 25b. Thus, the first and third portions 25a, 25c can be used to frictionally engage a wider region of material in the workpiece 60 and/or to define channels on the opposite surfaces of the workpiece 60. Each of the portions 25a, 25b, 25c can be independently rotatable, or connected to one or more of the other portions 25a, 25b, 25c and rotated therewith.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of friction stir welding a workpiece, the method comprising:

urging a friction stir welding pin against the workpiece;

rotating the friction stir welding pin; and adjusting a rotational speed of the friction stir welding pin cyclically between a minimum speed and a maximum speed with an average speed that is greater than zero and thereby friction stir welding the workpiece, wherein said adjusting step comprises cyclically adjusting the rotational speed of the pin at a frequency of variation between about 0.1 Hz and 100 Hz.

2. A method according to claim 1 wherein said adjusting step comprises cyclically adjusting the rotational speed of the pin between first and second predetermined speeds.

3. A method according to claim 1 wherein said adjusting step comprises cyclically adjusting the rotational speed of the pin between first and second predetermined speeds, the first speed being at least about 100 RPM and the second speed being greater than the first speed.

4. A method according to claim 1 wherein said adjusting step comprises cyclically adjusting the rotational speed of the pin between first and second predetermined speeds, the first speed being less than 99% of an average rotational speed of the pin and the second speed being greater than 101% of the average rotational speed of the pin.

5. A method according to claim 1 wherein said adjusting step comprises cyclically adjusting the rotational speed of the pin according to a sinusoidal variation in speed.

6. A method according to claim 1 wherein said adjusting step comprises cyclically adjusting the rotational speed of the pin to the minimum speed, the minimum speed being greater than zero and in the same direction as the maximum speed, such that the pin rotates in a single direction.

7. A method according to claim 1 wherein said adjusting step comprises providing a varying electric current to an actuator for rotating the pin.

8. A method according to claim 1 further comprising heating the workpiece to a preheat temperature before said urging step.

9. A method according to claim 8 wherein said heating step comprises energizing an induction heater.

10. A method according to claim 8 wherein said heating step comprises heating the workpiece by at least 50° F. to a temperature that is less than a plasticizing temperature of the workpiece.

11. A method according to claim 1 further comprising providing the workpiece, the workpiece comprising at least one of the group consisting of aluminum, aluminum alloys, titanium, titanium alloys, and steel.

12. A method according to claim 1 wherein said rotating step comprises rotating a friction stir welding pin having first and second independently rotatable portions.

13. A method according to claim 12 wherein said adjusting step comprises adjusting a rotational speed of each portion of the friction stir welding pin cyclically such that the first and second portions rotate at different speeds during at least a portion of said adjusting step.

14. A method according to claim 1 further comprising providing the pin, the pin having at least two portions, the portions defining dissimilar diameters.

15. A method of friction stir welding a workpiece, the method comprising:

urging a friction stir welding pin against the workpiece;

rotating the friction stir welding pin; and adjusting a rotational speed of the friction stir welding pin between a minimum speed and a maximum speed with an average speed that is greater than zero in accordance with a predetermined schedule and thereby friction stir welding the workpiece, wherein said adjusting step comprises adjusting the rotational speed of the pin at a frequency of variation between about 0.1 Hz and 100 Hz.

16. A method according to claim 15 wherein said adjusting step comprises adjusting the rotational speed of the pin between first and second predetermined speeds, the first speed being at least about 100 RPM and the second speed being greater than the first speed.

17. A method according to claim 15 wherein said adjusting step comprises adjusting the rotational speed of the pin between first and second predetermined speeds, the first speed being less than 99% of an average rotational speed of the pin and the second speed being greater than 101% of the average rotational speed of the pin.

18. A method according to claim 15 wherein said adjusting step comprises adjusting the rotational speed of the pin to the minimum speed, the minimum speed being greater than zero and in the same direction as the maximum speed, such that the pin rotates in a single direction.

19. A method according to claim 15 wherein said adjusting step comprises providing a varying electric current to an actuator for rotating the pin.

20. A method according to claim 15 further comprising heating the workpiece to a preheat temperature before said urging step.

21. A method according to claim 20 wherein said heating step comprises energizing an induction heater.

22. A method according to claim 20 wherein said heating step comprises heating the workpiece by at least 50° F. to a temperature that is less than a plasticizing temperature of the workpiece.

23. A method according to claim 15 further comprising providing the workpiece, the workpiece comprising at least one of the group consisting of aluminum, aluminum alloys, titanium, titanium alloys, and steel.

24. A method according to claim 15 wherein said rotating step comprises rotating a friction stir welding pin having first and second independently rotatable portions.

25. A method according to claim 24 wherein said adjusting step comprises adjusting a rotational speed of each portion of the friction stir welding pin in accordance with a predetermined schedule such that the first and second portions rotate at different speeds during at least a portion of said adjusting step.

26. A method according to claim 15 further comprising providing the pin, the pin having at least two portions, the portions defining dissimilar diameters.

27. A friction stir welding apparatus comprising:

a rotatable pin structured to be urged against a workpiece to friction stir weld the workpiece;

an actuator configured to rotate the pin; and a controller configured to adjust the actuator and thereby adjust a rotational speed of the pin according to a predetermined schedule, wherein the controller is configured to cyclically adjust the actuator and thereby adjust the rotational speed of the pin at a frequency of variation between about 0.1 Hz and 100 Hz between a minimum speed and a maximum speed with an average speed that is greater than zero.

28. A welding apparatus according to claim 27 wherein the controller is configured to cyclically adjust the actuator and thereby adjust the rotational speed between first and second predetermined speeds.

29. A welding apparatus according to claim 27 wherein the controller is adjust the actuator and thereby adjust the rotational speed between and second predetermined speeds, the first speed being at least about 100 RPM and the second speed being greater than the first speed.

30. A welding apparatus according to claim 27 wherein the controller is configured to cyclically adjust the actuator and thereby adjust the rotational speed of the pin between first and second predetermined speeds, the first speed being less than 99% of an average rotational speed of the pin and the second speed being greater than 101% of the average rotational speed of the pin.

31. A welding apparatus according to claims 27 wherein the controller is configured to cyclically adjust the actuator and thereby adjust the rotational speed of the pin sinusoidally.

32. A welding apparatus according to claim 27 wherein the controller is configured to cyclically adjust the rotational speed of the pin to the minimum speed, the minimum speed being greater than zero and in the same direction as the maximum speed, and thereby rotate the pin in a single direction.

33. A welding apparatus according to claim 27 wherein the controller is configured to adjust an electric current provided to the actuator.

34. A welding apparatus according to claim 27 further comprising a heater configured to heat the workpiece.

35. A welding apparatus according to claim 34 wherein the heater is an induction heater.

36. A welding apparatus according to claim 27 wherein the pin includes first and second portions, the portions being independently rotatable.

37. A welding apparatus according to claim 36 wherein the pin includes first and second actuators for independently rotating the first and second portions of the pin, respectively.

38. A welding apparatus according to claim 27 wherein the pin defines at least two portions, the two portions defining dissimilar diameters.

* * * * *